United States Patent [19]

Rohrbacher

[11] Patent Number: 4,936,936
[45] Date of Patent: Jun. 26, 1990

[54] METHOD OF MAKING THERMOPLASTIC ACRYLIC POLYMER COATED COMPOSITE STRUCTURE

[75] Inventor: Frank Rohrbacher, Wilmington, Del.

[73] Assignee: E. I. du Pont de Nemours and Company, Wilmington, Del.

[21] Appl. No.: 238,100

[22] Filed: Aug. 30, 1988

[51] Int. Cl.⁵ ............................................. B32B 1/10
[52] U.S. Cl. .................................. 156/239; 156/245; 427/393.5; 428/483; 428/516
[58] Field of Search ............... 428/483, 516; 156/239, 156/238, 230, 245, 222; 264/331.13, 331.15, 511; 427/372.2, 388.5, 393.5

[56] References Cited

U.S. PATENT DOCUMENTS

| | | | |
|---|---|---|---|
| 3,419,458 | 12/1968 | Brooks et al. | |
| 3,660,537 | 5/1972 | Fryd et al. | |
| 3,679,510 | 7/1972 | Conley et al. | 156/245 |
| 3,823,205 | 7/1974 | Zimmt | |
| 3,928,710 | 12/1975 | Arnold et al. | 428/483 |
| 4,075,266 | 2/1978 | Theysohn | 264/92 |
| 4,643,789 | 2/1987 | Parker et al. | 156/219 |
| 4,650,533 | 3/1987 | Parker et al. | 156/219 |
| 4,818,589 | 4/1989 | Johnson et al. | 156/238 X |
| 4,838,973 | 6/1989 | Mentzer et al. | 156/216 X |

FOREIGN PATENT DOCUMENTS 1404394 8/1970 Fed. Rep. of Germany.

Primary Examiner—Michael W. Ball
Assistant Examiner—Chester T. Barry
Attorney, Agent, or Firm—Hilmar L. Fricke

[57] ABSTRACT

A process for forming a composite useful as an exterior vehicle part that has the following layered components:
  a. a layer of a glossy clear acrylic thermoplastic finish bonded firmly to
  b. a layer of an acrylic thermoplastic pigment containing paint firmly bonded to
  c. a flexible thermoformable polymeric material that is bonded to
  d. a thick rigid synthetic resinous substrate;

The resulting composite and thermoformable laminate that can be made into the above composite having the layers a.-c. of the above structure also are part of this invention.

30 Claims, 3 Drawing Sheets

METHOD OF MAKING THERMOPLASTIC ACRYLIC POLYMER COATED COMPOSITE STRUCTURE

BACKGROUND OF THE INVENTION

This invention is related to a composite and in particular to a composite structure having an acrylic polymer coating.

Exterior auto and truck parts such as fenders, quarter panels, doors, trim parts bumpers, fender extensions and other molded exterior parts of moldable thermoplastic polymers are currently being used because of their resistance to permanent deformation on impact and their corrosion resistance. Typical moldable thermoplastic polymers that are being use for these parts are polypropylene, polyethylene, ABS (acrylonitrile-butadiene-styrene terpolymers), polystyrene, and styrene-acrylonitrile copolymers. These polymers are easily and economically molded into auto and truck parts that are substantially lighter than currently used sheet metal parts thereby favorably affecting the weight and fuel economy of the auto or truck and are not easily dented or subject to deterioration by corrosion and weathering and are replacing metal parts of automobiles and trucks. Another advantage of these polymers is that more intricate designs can be made in comparison to sheet metals giving the auto makers increased freedom in design of autos.

To reduce air pollution, automobile and truck manufactures need to reduce the amount of painting in the manufacturing process. It would be desirable to have a thermoplastic auto or truck part that has a high quality durable and weatherable surface whose color matches the painted sheet metal used to make the auto or truck and that can attached directly in the assembly process and does not require further priming or painting. This would eliminate the costly and time consuming painting process for thermoplastic parts with the associated pollution problems.

Thermoforming of a thermoplastic sheet having a painted or decorated finish has not been successful with typical exterior acrylic finishes that are used for automobiles and trucks that provide required good appearance with durability and weatherablility. In thermoforming of the thermoplastic sheet to form the part, the finish or decorated surface must flow with the thermoplastic substrate. Typical . automotive thermoplastic acrylic lacquers and thermosetting acrylic enamels are rigid finishes that are impossible to process under thermoforming conditions and crack, distort or degrade. Attempts have been made to reformulate such finishes to flexibilize the finish sufficient for thermoforming but resulted in a finish that is too soft for use as an automotive or truck finish.

It is an objective of this invention to provide a practical and economical process for the preparation of thermoplastic acrylic polymer coated thermoformed parts having an excellent overall appearance and a finish that is durable and weatherable and can be used for the exterior of automobiles and trucks.

SUMMARY OF THE INVENTION

A process for forming a composite useful as an exterior vehicle body part using the following steps:
a. a clear layer of an acrylic thermoplastic polymer coating composition is applied to a flexible polymeric carrier sheet having a smooth glossy surface; wherein the acrylic polymer has a glass transition temperature of about 75°–105° C. and comprises polymethyl methacrylate, copolymers of methyl methacrylate or graft copolymers of methyl methacrylate or mixtures thereof in an organic solvent having at least 15% by volume of high boiling solvent;
b. the clear layer is partially dried leaving about 5–15% by weight, based on the weight of the clear layer, of solvent in the layer;
c. a pigmented layer of an acrylic thermoplastic polymer coating composition is applied onto the clear layer wherein the polymer has a glass transition temperature of about 75°–105° C. and comprises polymethyl methacrylate, copolymers of methyl methacrylate or graft copolymers of methyl methacrylate or mixtures thereof and pigment in an organic solvent having at least 15% by volume of high boiling solvent;
d. the pigmented layer is partially dried leaving about 5–15% by weight, based on the weight of the pigmented layer, of solvent in the layer;
e. the flexible polymeric carrier sheet with the clear layer and pigmented layer is laminated with heat and pressure to a flexible thermoformable polymeric material with the pigmented layer being adhered to the thermoformable polymeric material to form a laminate; wherein on removal of the carrier sheet, the exterior surface of the clear layer substantially retains the gloss surface transferred to it from the polymeric carrier sheet;
f. the polymeric carrier sheet is removed from the laminate;
g. the laminate with the clear layer and pigmented layer thereon is thermoformed to form a three dimensionally shaped preformed laminate; and
h. the flexible polymeric material of the thermoformed laminate is adhered to a rigid synthetic resinous substrate to form a composite useful as an exterior vehicle body part.

The resulting composite prepared by the above process and the laminate prepared by the above process in steps a.–e. also are part of this invention.

DETAILED DESCRIPTION OF THE INVENTION

Figure 1:
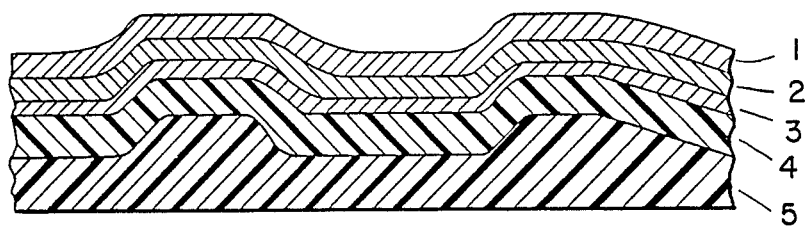
FIG. 1 shows a cross section of the thermoformed composite.

A cross section of the composite is shown in FIG. 1. Layer 1 which is the exterior layer of the composite is a cured acrylic thermoplastic polymer clear coating that has a glossy finish of automotive quality and must have excellent weatherability, scratch and mar resistance and good gloss retention on weathering. Layer 1 is firmly adhered to paint layer 2 which is a pigmented cured acrylic thermoplastic polymer coating of automotive quality that must withstand weathering and not crack and fade. The combination of layers 1 and 2 must provide the composite with an automotive quality finish that has excellent gloss, high distinctness of image, gasoline resistance, abrasion and mar resistance, acid resistance and excellent weatherability including good gloss retention.

Layer 3 is a preferred optional layer or layers of a thin layer of a thermoplastic polymer, preferably a chlorinated polyolefin that provides intercoat adhesion of the pigmented thermoplastic acrylic layer 2 to layer 4 which is a flexible thermoformable polymeric material. Layer 5 is a relatively thick rigid synthetic resinous substrate, preferable a thermoplastic injection molded polymeric material, to which layer 4 is firmly adhered.

Preferably, the thermoformed composite made according the process of this invention has the following thicknesses for each layer of the composite:

1. 10-125 micron thick layer of the glossy clear thermoplastic finish that is bonded firmly to
2. 5-75 micron thick layer of the thermoplastic pigment containing paint layer that is firmly bonded to
3. (optional) 1-20 micron thick layer or layers of a thermoplastic polymer that is firmly bonded to
4. 250-1250 micron thick layer of a flexible thermoformable material that is bonded to
5. 500-25,000 micron thick rigid layer of a rigid synthetic resinous material.

Figure 2:
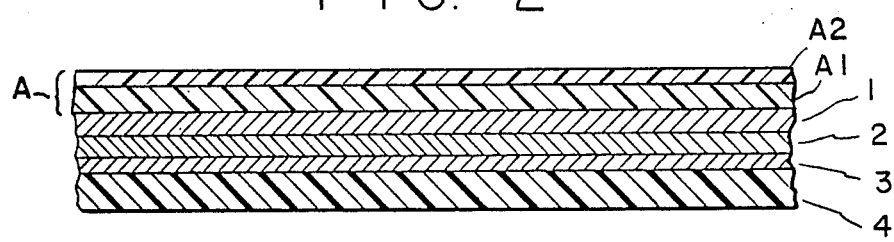
FIG. 2 shows a cross section of the thermoformable laminate or face sheet.

In the formation of the composite, a thermoformable laminate or face sheet is first formed. FIG. 2 shows a cross section of the laminate or face sheet. The face sheet is composed of layers 1-4 of the composite before being thermoformed. FIG. 2 also shows a coated flexible polymeric carrier sheet A, preferably a polyester film A1 coated with a low surface energy polymeric coating A2.

The face sheet without the carrier sheet preferably has the following thickness for each of the layers used:

1. 10-125 micron thick layer of the glossy clear thermoplastic finish that is bonded firmly to
2. 5-75 micron thick layer of the thermoplastic pigment containing paint layer that is firmly bonded to
3. (optional) 1-20 micron thick layer or layers of a thermoplastic polymer that is firmly bonded to
4. 250-1250 micron thick layer of a flexible thermoformable material.

Figure 3:
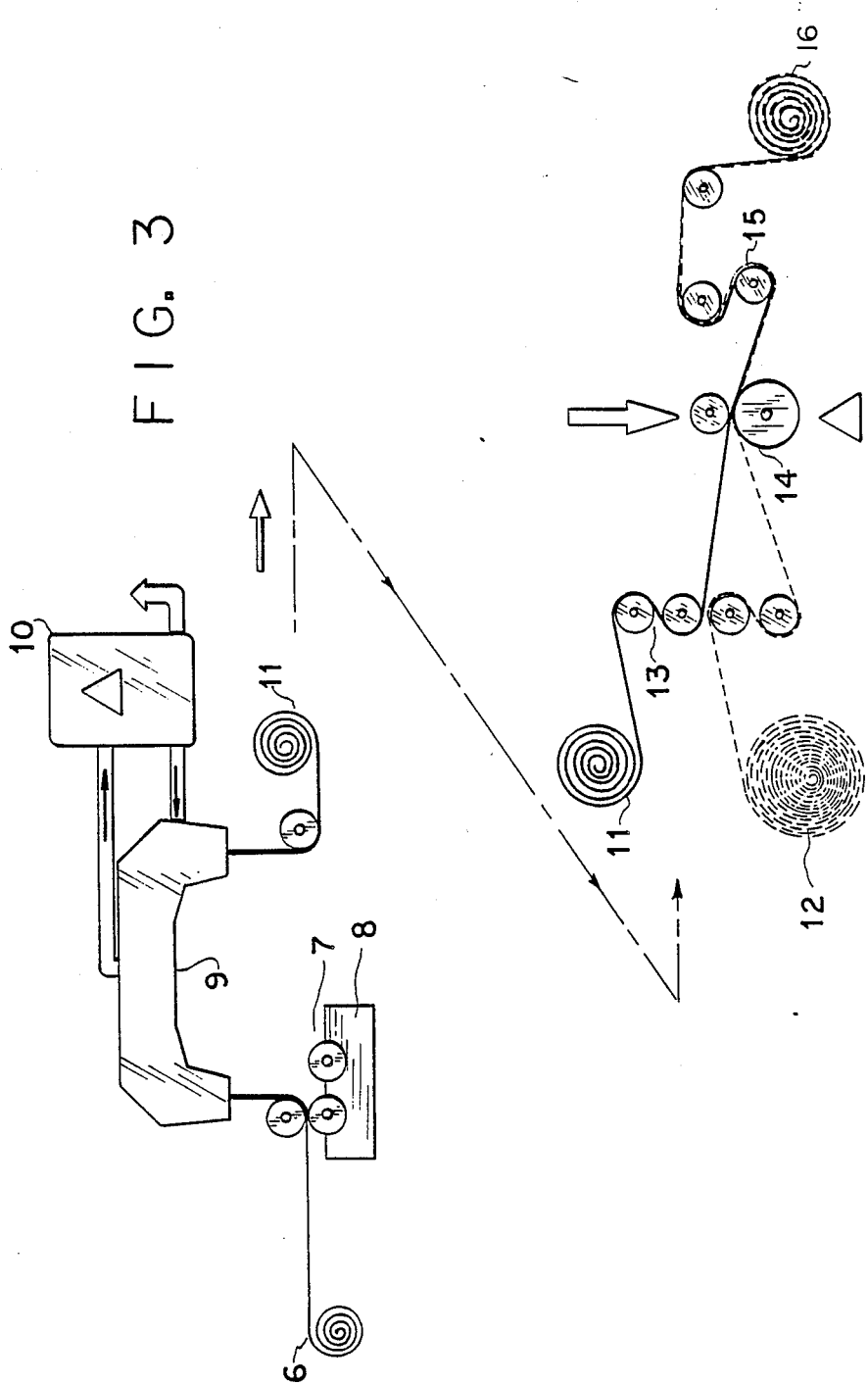
FIG. 3 shows roller coating of paint onto a polyester film and the formation of the thermoformable laminate or face sheet.

FIG. 3 shows a process for making the laminate or face sheet. A flexible polymeric carrier sheet, 6 preferably a polyester film, typically a "Mylar" 200A polyethylene terephthalate film about 50 microns thick, is fed through a 3 roll roller coater 7 containing a clear coating composition 8 and by reverse roller coating about a 10-125 micron thick coating (dry basis) is applied. Coating line speeds of about 5-25 meters/minute are used. The coated film is then passed through the oven 9, preferably having multiple heating zones; typically three heating zones are used. The first zone is at about 50° C. and the last zone is at about 150° C. Oven drying temperatures and line speed are adjusted so that the resulting clear layer after drying retains about 5-15% by weight of solvent. A solvent incinerator 10 is used to incinerate solvent fumes from the coating composition. The coated film is then wound into roll 11. The roller coater 7 is filled with a pigmented coating coating composition instead of the clear composition and the process is repeated to apply about 5-75 micron thick coating (dry basis) of the pigmented coating or color coat over the clear coat layer on the film to form a polyester film having a clear coat layer and a color coat layer. The color coat layer is dried as above so that the resulting color coat layer retains about 5-15% by weight of solvent. Optionally, the color coat layer is coated using the same process with a 1-25 micron thick layer (dry basis) of a size layer of thermoplastic polymeric material and dried under conditions such that 5-15% by weight of solvent is retained in the clear coat layer and the color coat layer.

The resulting coated polyester film is then laminated to a flexible thermoformable polymeric sheet material 12 about 250-1250 microns in thickness with the coated side of the polyester film being contacted with the thermoformable polymeric sheet material. The roll of coated polyester film 11 and a roll of the thermoformable polymeric sheet material are fed at a line speed of about 5-20 meters/minute through guide rollers 13 and then through two heated nip rollers 14 at a temperature of about 150°-250° C. and using a pressure of about 10-75 kg/linear cm. The resulting laminate is passed around chill roll 15 and the resulting face sheet is wound into roll 16.

To prevent sticking of the color coat layer to the surface of the polyester film when the roll is wound, it is preferred to coat the surface of the polyester film not in contact with the clear coat and color coat layer with a very thin layer of a low surface energy polymeric coating that has a surface energy of less than 42 dynes/cm and at least 4 dynes/cm less than the polyester film. Preferably, the coating has a surface energy of about 30-42 dynes/cm and has a dry film thickness of about 5-25 microns. The coating is applied as above by filling the coater 7 with the low surface energy coating composition and then applying the composition and heating as above. A typical low surface energy coating composition contains an alkyd resin or an acrylic modified alkyd resin, vinyl chloride/vinyl acetate/ vinyl alcohol polymer, crosslinked with a fully alkylated melamine resin. Polyethylene wax or polymethylsiloxane resin are added to adjust surface energy. An extender pigment such as aluminum silicate pigment is added to adjust roughness and a catalyst such as paratoluene sulfonic acid is added to improve cure response.

Figure 4:
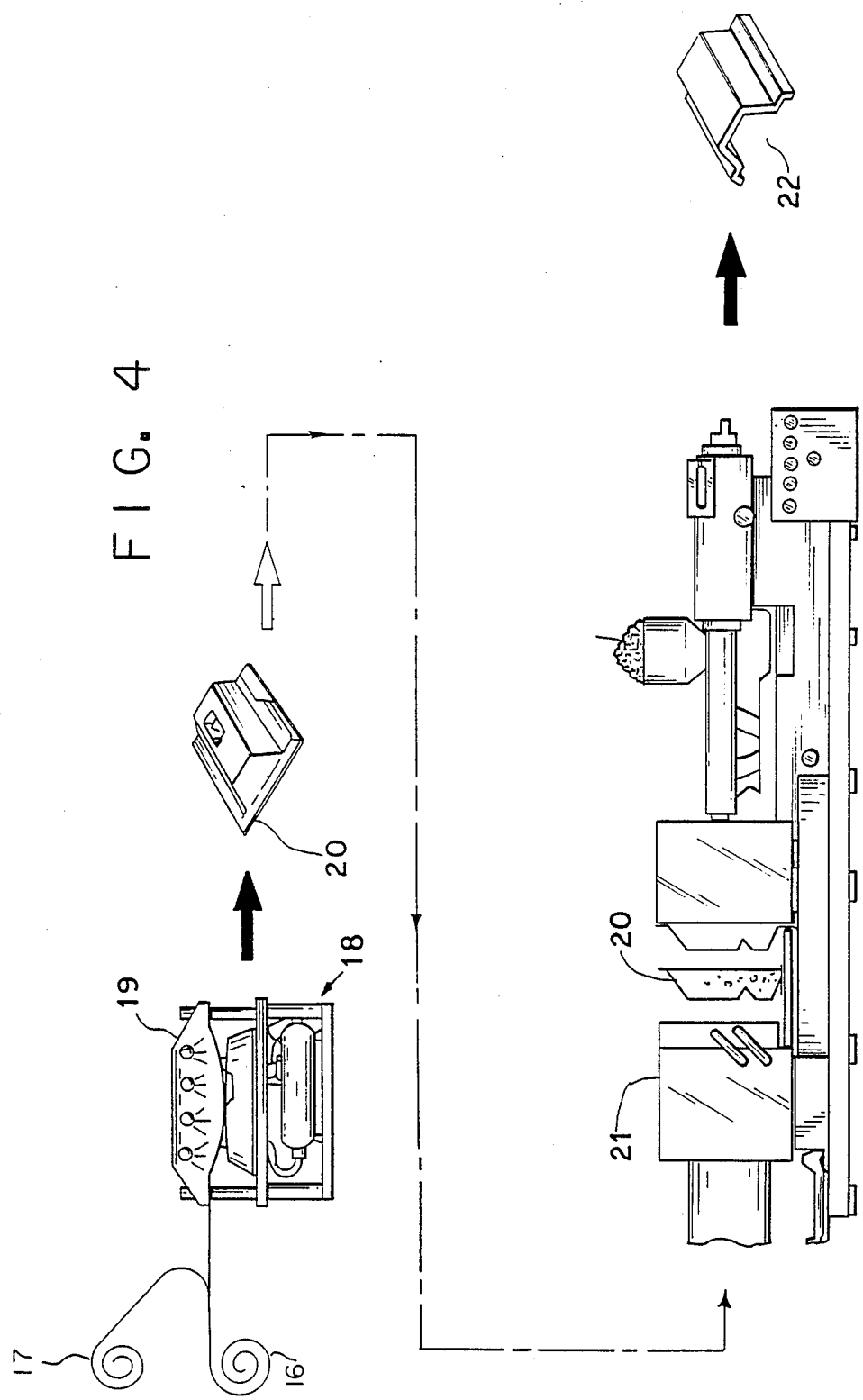
FIG. 4 shows the process for making the composite from the laminate or face sheet.

FIG. 4 shows the removal of the polyester film from the face sheet 16 which is wound onto a roll 17. A section of the face sheet then is thermoformed into into a shaped structure by placing it in a vacuum former 18 containing heating lamps 19 and the face sheet is heated to about 100°-180° C. The sheet is then vacuum formed into a shaped structure 20 having a painted surface which can be used in an injection molding process or in another molding process to form an auto or truck part. The shaped structure 20 is positioned in a conventional injection molding machine 21 in which a thick layer of a thermoplastic resin is injection molded to form a backing layer about 500-25,000 microns in thickness. The resulting part 22 is useful for autos and trucks and has a surface that is smooth and glossy, has an excellent distinctness of image and good color uniformity and in general meets all the requirements of an automotive finish.

The glossy clear finish and the color coat layer provide the laminate with an exterior decorative finish that is acceptable for automobiles and trucks. The finish must have the following properties to be useful as an automotive or truck finish: a gloss measured at 20° of at least 80 and measured at 60° of at least 90, a distinctness of image (DOI) of at least 80, gasoline resistance, cleanability, acid spot resistance, hardness of at least 6 Knoops, chip resistance, impact strength of at least 20 inch pounds measured at room temperature and at −29° C., excellent paint adhesion, resistance to water and humidity exposure and excellent outdoor weatherability.

The following is a description of the test methods used to determine the above properties. Certain test methods identified below are publicly available standard industry specifications and test methods which are incorporated herein by this reference.

Gloss is measured by specular reflectance of a beam of light at angles of 20° and 60°. Specular reflectance is measured before the finished painted surface is buffed and waxed. A Byk-Mallinckrodt "multigloss" or "single gloss" gloss meters are used for measuring specular gloss of the finish. These gloss meters give values equivalent to those obtained from ASTM Method D-523-67. The preferred test method is described in GM Test Specification TM-204-A.

Distinctiveness-of-Image (DOI) is a measurement of the clarity of an image reflected by the finish. DOI is measured from the angle of reflection of a light beam from a spherical surface. DOI is measured by the Hunterlab Model No. D47R-6F Doigon Gloss Meter. A test panel is placed on the instrument sensor and the sharpness of the reflected image is measured. Details of the DOI test procedure are described in GM Test Specification TM-204-M.

Gasoline Resistance requires no color change, degradation, tackiness, marring or loss of paint adhesion on plastic parts after a finished part is immersed for ten seconds, ten times, in a specified reference fuel with a 20 second dry off period between each immersion. Immediately after the tenth immersion, the painted surface is checked and must pass Thumbnail Hardness according to GM Test Specification TM 55-6.

Cleanability is tested according to GM Test Specification TM 31-11 in which the painted plastic part is subjected to ten rubs with cheesecloth saturated with 9981062 Naphtha or currently used and approved cleaning solvents. There should be no evidence of staining, discoloration, or softening of the painted surface and no evidence of color transfer from the test part to the cloth. One rub consists of one forward and backward motion.

The Acid Spotting Resistance Test requires the painted part to withstand exposure to 0.1 N sulfuric acid for 16 hours without any evidence of staining, discoloration, or softening of the paint.

Hardness is measured by a standard Knoop Hardness Test.

Chip resistance is determined by a Gravelometer Test described in SAE J-400. The painted part as received and after 3 and 6 months Florida exposure, described below, is tested at −23° C. and must have a minimum rating of 8 as determined by F. B. Gravelometer Rating Chart.

Impact strength of a painted part is tested at room temperature by the Gardener Test and by the Rosand Test at −29° C.

Paint Adhesion of a painted part is determined by a standard Tape Adhesion Test described in GM Test Specification TM 55-3. According to this test, a tape is pressed down over an X-shaped cut in the paint coat and the tape is then removed to test the amount of peeling. The test requires a minimum of 99% of the paint remaining in the tape test area.

Resistance to Water and Humidity Exposure is measured by several tests. In one test, the finished part is exposed to 96 hours of humidity exposure at 100% relative humidity and 38° C. in a humidity cabinet defined in GM test specification TM 55-3, and a two-hour water immersion test at 38° C. according to GM test specification TM 55-12. The resulting paint panel should show no evidence of blistering when examined one minute after removal from the test cabinet and shall withstand the Paint Adhesion Test described above. The Paint Adhesion Test is performed within one minute after removal from either test cabinet. In a second test, the painted panel should withstand 15 cycles of the Moisture-Cold Cycle Test defined in GM test specification TM 45-61A, without any visible signs of cracking or blistering. After 15 cycles, the paint panel is exposed to 96 hours of the humidity exposure described above, followed by the Paint Adhesion Test also described above. The panel is expected to pass both tests. The Paint Adhesion Test is performed within one minute after removal from the humidity environment. One cycle consists of 24 hours and 100% relative humidity at 38° C., 20 hours at −23° C., and four hours at room temperature.

For outdoor weatherability, painted panels are exposed for 3 years in Florida facing south in a black box positioned 5° from the horizontal. The painted panels should retain 40% of their original gloss and there should be no blistering or fading of the paint.

The finish of the clear and color coat of the laminate must be sufficiently flexible at thermoforming temperatures and must have sufficient durability to withstand thermoforming and the molding process without embrittling, cracking or otherwise degrading the finish. The finish must be thermoplastic and flexible and must retain its gloss and other appearance properties after processing.

The thermoplastic acrylic polymer used in the clear and pigment coating compositions as the film forming constituent has a eight average molecular weight of about 50,000–500,000 and has a glass transition temperature of about 75°–105° C.

The glossy clear finish is formed from a clear coating composition. The composition contains about 15–80% by weight film forming binder and correspondingly about 85–20% by weight of a liquid carrier. The composition has a solvent carrier and the binder of the composition may be in solution or in dispersion form. The clear coat must be able to withstand an elongation of about 40–150% at a film thickness of about 10–125 microns and thermoforming temperatures.

Typically, an acrylic resin such as polymethyl methacrylate and copolymers thereof can be used as the binder for the clear coating composition. The term copolymer is used herein to designate multi-component polymers such as terpolymers, 4 component polymers, 5 component polymers and the like. Coating compositions of blends of such polymers are disclosed in Zimmt U.S. Pat. No. 3,823,205 issued July 9, 1974 which is hereby incorporated by reference.

Typical monomers that can be used with methyl methacrylate to form such copolymers are alkyl esters of acrylic acid or methacrylic acid where the alkyl group has from 1–18 carbon atoms such as methyl acrylate, ethyl acrylate or methacrylate, propyl acrylate or methacrylate, isopropyl acrylate or methacrylate, various butyl acrylates or methacrylates, cyclohexyl acrylate or methacrylate, benzyl acrylate or methacrylate, phenyl acrylate or methacrylate, hexyl, octyl, dodecyl, hexadecyl, or octadecyl acrylates or methacrylates, lauryl acrylate or methacrylate; other monomers can be used such as acrylonitrile, methacrylonitrile, acrylamide, methacrylamide, styrene, alpha-methyl styrene, vinyl toluene, acrylic acid, methacrylic acid, maleic acid or its anhydride, fumaric acid, crotonic acid, allyl methacrylate or acrylate, allyl acetate, glycidyl methacrylate or acrylate, alkyl amino alkyl methacrylate or acrylate such t-butyl amino ethyl methacrylate, dimethyl amino ethyl methacrylate, hydroxy alkyl acrylates or methacrylates such as hydroxyethyl methacrylate, hydroxy ethyl vinyl ether, hydroxyethyl vinyl sulfide, vinyl pyrrolidone and the like.

Dispersions of polymethyl methacrylate copolymers such as "Lucite" Dispersion Lacquers (LDL) also can be used. Typically useful LDL coating compositions are described in U.S. Pat. No. 3,660,537 issued May 2, 1972 to Fryd et al which is hereby incorporated by reference. Typically useful coating compositions contain polymethyl methacrylate and a graft copolymer having a backbone of polymerized monomers of ester of acrylic acid or methacrylic acid and allyl methacrylate or allyl acrylate grafting sites having grafted thereto polymeric segments of alkyl acrylate or alkyl methacrylate units.

The above methacrylate compositions and the LDL compositions contain from about 10–30% by weight, based on the weight of the film forming binder, of components such as plasticizers, ultraviolet light screeners, ultraviolet light stabilizers, microgels, flow control agents and mixtures of any or all of the above.

Typically useful plasticizers are for example, phthalate esters such as butylbenzyl phthalate, dibutyl phthalate, 2-ethyl hexylbenzyl phthalate, dicyclohexyl phthalate, dibenzyl phthalate, butylcyclohexyl phthalate, di-2-ethylhexyl ester of hexamethylene diphthalate, di-(methylcyclohexyl)phthalate. One preferred plasticizer of this group is butylbenzyl phthalate. Other plasticizers that can be used are mixed benzoic acid and fatty oil acid esters of pentaerythritol, poly(propylene adipate) dibenzoate, diethylene glycol dibenzoate, ethylene glycol adipate benzoate and neopentyl glycol adipate benzoate. Other useful plasticizers are tetrabutylthiodisuccinate, butylphthalyl butyl glycolate, acetyltributyl citrate, dibenzyl sebacate, tricresyl phosphate, toluene ethylsulfonamide.

To improve weatherability of the clear coat about 0.1–5%, by weight, based on the weight of the binder, of an ultraviolet light stabilizer or screeners or a combination of ultraviolet light stabilizers and screeners can be added to the clear coating composition. Typically useful ultra-violet light stabilizers and screeners are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',2'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of dialyl-4-hydroxy phenyl triazines, hydroxy phenyl-1,3,5-triazine and the like.

Benzoates such as dibenzoate of diphenylol propane, tertiary butyl benzoate of diphenylol propane and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those in Murayama, et al., U.S. Pat. No. 4,061,616, issued Dec. 6, 1977.

The clear coat can also contain transparent pigments, i.e., pigments having the same or similar refractive index as the binder of the clear coat and are of a small particle size of about 0.015–50 microns. Typical pigments that can be used in the clear coat in a pigment to binder weight ratio of about 1/1000 to 10/1000 are inorganic siliceous pigments, such as silica pigments. These pigments have a refractive index of about 1.4–1.6.

The color coating composition used herein has as the binder any of the aforementioned binders used in the clear coating composition and also can use the same plasticizers and it may be advantageous to use ultraviolet stabilizers and/or screeners in composition. The composition contains pigments in a pigment to binder weight ratio of about 1/100 to 100/100. The term "binder" refers to the film forming constituents of the coating composition.

Any of the conventional pigments used in coating compositions can be utilized such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

The pigments are formulated into a mill base by mixing the pigments with a dispersing resin which may be the same as the binder of the composition or may be another compatible dispersing resin or agent. The pigment dispersion is formed by conventional means such a sand grinding, ball milling, attritor grinding, two roll milling. The mill base is then blended with the binder of the composition to form the coating composition.

Clear and color coat layers of the aforementioned methacrylate and LDL coating compositions will be brittle and crack on storage, during lamination and thermoforming unless the compositions are formulated with certain active retarder solvents. Typically, these coating compositions contain about 15–50% by weight of film forming binder and correspondingly about 50–85% by weight of a liquid solvent carrier. At least 15% by volume of the liquid solvent carrier is an active retarder solvent or solvents that have a boiling point of about 150°–300° C.

In order to be considered an active retarder solvent, the solvent must totally dissolve or solubilize the coating when applied to a layer of the dried coating. Typically useful active retarder solvents are as follows: 2,2,4-trimethyl pentanediol-1,3 monisobutyrate having a B.P. (boiling point) of 248° C., 2-ethyl hexanol B.P. 182°–186° C., mixed methyl esters of succinic, glutaric and adipic acids B.P. 196°–225° C., ethylene glycol monobutyl ether acetate B.P. 181°–194° C. and diethyl phthalate B.P. 295° C.

After the application of the clear coating composition to the polyester film, baking conditions are controlled so that the clear layer is only partially cured and that the layer retains about 5–15% by weight solvent which is mostly active retarder solvent. Similarly, the baking conditions are controlled after application of the color coating composition so that the color layer retains about 5-15% by weight solvent which is mostly active retarder solvent.

To determine the amount of solvent in layer, a sample is heated for about 90 minutes at 105° C. and the weight of the sample is determined and the percent solvent calculated. The active retarder solvents act as a transient plasticizer which reduces the glass transition temperature of the layer of the coating and flexibilizes the coating which eliminates cracking during processing and laminating. During thermoforming much of the solvent evaporates but any remaining solvent reduces the tendency of the clear coat/color coat finish to crack during the final molding step. The high boiling point of the active retarder solvents ensures that any escaping solvent does not pop or blister the finish. Any residual solvent left in the finish of the resulting composite will evaporate under ambient conditions within several days or the composite may be heated to drive off residual solvent.

The flexible polymeric carrier sheet with the clear layer and the pigmented layer can be laminated directly to the flexible thermoformable polymeric material to form a laminate. The pigmented layer is placed in contact with the flexible thermoformable material. Often it is convenient or necessary to apply a thin size layer or several size layers to the pigmented layer to improve or enhance adhesion to the flexible material. Typical polymeric materials useful for the size layer are polyalkyl acrylates, polyalkyl methacrylates, vinyl chloride polymers, polyurethanes, polyimides, chlorinated polyolefins and mixtures of the above.

A chlorinated polyolefin size has been found to be particularly useful for adhering to thermoformable polyolefin flexible substrates. The chlorinated polyolefin size layer is applied to the pigmented layer using the above described coating procedure. A coating composition of a solution of the chlorinated polyolefin is formed. The coating composition contains about 10-60% by weight of the chlorinated polyolefin and correspondingly, about 40-90% by weight of solvent. Any of the conventional solvents can be used that will dissolve the chlorinated polyolefin such as toluene, xylene, n-methyl pyrrolidone and mixtures thereof. The chlorinated polyolefin preferably is a chlorinated polypropylene or chlorinated polyethylene containing up to 50% by weight chlorine and preferably 15-50% by weight chlorine. One preferred chlorinated polypropylene is a propylene/maleic anhydride copolymer chlorinated to a level of about 15-50% by weight chlorine. One particularly preferred chlorinated polypropylene of polypropylene and maleic acid contains about 18-35% by weight chlorine and has an acid no. of about 15.

Up to about 70% but preferably less than 50% by weight of another thermoplastic polymer can be mixed with the chlorinated polyolefin which under some conditions improves the adhesion of the color coating. Typical thermoplastic polymers that can be used are ethylene vinyl acetate polymers, alkyd resins and acrylic polymers.

The thermoformable flexible layer and the rigid layer of the composite are prepared from standard automotive grade resins. These resins typically are compounded from thermoformable resins, synthetic rubbers, additives, antioxidants and pigments. Typical thermoformable resins used have a melt flow between 0,5-35 g/10 min.. The following are typical rubbers that are compounded with the polypropylene resins: ethylene/propylene rubbers or ethylene/propylene/maleate rubbers. The compounded resins usually contain pigments such as carbon black, calcium carbonate, silica, talc and other filler or reinforcing pigments. Colored pigments described above can also be used. The specific formula for the compounded resins varies according to each supplier but each composition must meet the structural specifications such as flexural modulus, tensile strength, elongation, tear strength and hardness and process constraints such as melt flow and mold shrinkage.

Particularly useful thermoformable resins used for the flexible layer are polyolefins such as polyethylene, polypropylene, acylonitrile/butadiene/styrene polymers, polystyrene, styrene/acrylonitrile copolymers. The acrylic clear and pigmented layer are relatively rigid and brittle and can be used over semirigid thermoformable resins that should a flexural modulus of about 100,000-350,000 psi (pounds per square inch).

The layer of flexible thermoformable polymeric material can be formed into a 250-1250 micron thick sheet using conventional techniques and equipment such as extrusion techniques and equipment. Resins with melt flow indexes of about 0.5-8.0 g/10 min. can be used but resins with melt flow indexes of about 0.5-2.0 g/10 min. are preferred.

The conditions used to form the flexible sheet are such that a sheet with a smooth 'Class A" surface is formed and the sheet has low internal stresses. Stresses in the flexible sheet are measured by cutting a 4×4 inch section of the sheet and laying the section on a flat surface. The edges and the corners of the section should lie flat for an unstressed film.

The resin used to form the rigid layer of the composite is an automotive quality resin having a melt flow of about 0.5-8.0 g/10 min. Preferably, the resin has a melt flow of about 4.0-8.0 g/10 min. Any of the aforementioned resins used for the flexible layer can be used that have the above properties.

Also, other resinous materials can be used for the rigid layer such as RIM, reinforced injection molded materials which crosslink on curing. It is also possible to use sheet molding compounds (SMC) which are commonly used to make auto and truck parts. Can be used with conventional or SMC press to form the composite.

Since the surface of the composite of this invention is determined by the surface of the flexible layer, only the flexible layer need be of a high quality resin while the rigid layer of the composite can be of a lower quality resin. For example, the rigid layer may contain gel particles which would not affect the appearance or the structural integrity of a resulting part formed from the composite.

The ability to separate the surface characteristics from the resin used to form the rigid layer of the composite allows for the formation of greatly improved parts. For example, fiberglass reinforced or other filler reinforced resins can be used for the resin for the rigid layer of the composite and stronger more rigid parts can be made than has heretofor been possible.

The composite of this invention provides automotive manufacturers with many advantages over prior art compositions. Adhesion problems within the recessed portions of a part are minimized, solvent emissions associated with spray painting are eliminated, the need for expensive hangers and jigs to maintain shape of a plastic part during baking of an applied paint are eliminated and the need for a primer which is required with a conventional paint spraying process also is eliminated. Additionally, the composite has a unique set of characteristics that make it superior to conventional injection molded and spray painted parts.

The following Examples illustrate the invention. All parts and percentages are on a weight basis unless otherwise indicated and molecular weights are determined by gel permeation chromatography using polymethyl methacrylate as a standard.

Example 1

A thermoformed thermoplastic polyolefin (TPO) quarter panel for a Pontiac Fiero having an exterior high gloss jet black automotive paint was formed. A cross section of the the quarter panel is similar to that shown in FIG. 1.

A low surface energy rough enamel was prepared and coated onto one surface of a sheet of flexible polyester film onto which the clear and color coat layers are to be coated to prevent sticking of the clear and color coat to the polyester film when the film is coated. The polyester film is a 50 micron thick high gloss "Mylar" 200A polyethelene terephthalate film made by E. I. Du Pont de Nemours and Company.

The low surface energy rough enamel composition was prepared as follows:

| Ingredient | Parts by Weight |
| --- | --- |
| Aluminum Silicate Millbase | 34.9 |
| Isopropyl alcohol | 7.80 |
| Methyl isobutyl ketone | 42.40 |
| Union Carbide "UCAR" | 10.20 |
| Aluminum Silicate Pigment | 26.30 |
| Polyethylene Wax | .60 |
| Acrylic Modified Alkyd | 12.70 |
| resin Solution (57.5% non volatile solvent) | 100.00 |
| Clear Intermediate | 38.3 |
| Isopropyl alcohol | 9.00 |
| Methyl isobutyl ketone | 56.70 |
| Union Carbide UCAR ™ VAGH | 15.10 |
| Acrylic modified alkyd resin solution (57.5% N. V.) | 19.20 |
| Silicone Solution (60% non volatile solvent) | 1.2 |
| Paratoluene sulfonic acid (40% non volatile solvent) | 4.0 |
| Fully methylated melamine | 6.5 |
| Methyl isobutyl ketone | 0.5 |
| 85/15 methyl isobutyl ketone/ Isopropyl alcohol | 14.5 |
| | 100.00 |

The aluminum silicate millbase was mixed and ground in a sandmill to a fineness of 5–10 microns. The aluminum silicate pigment was Engelhard Minerals and Chemical Company's ASP400 grade, the polyethylene wax was Shamrock Chemicals Corporation's S381-N1 grade and the acrylic modified alkyd resin solution was Chempol 13-1501-acrylic made by the Freeman Chemical Corporation.

The low surface energy rough enamel coating was applied by reverse roll coater to the polyester film (illustrated in FIG. 2). The enamel coating was cured on the polyester sheet by passing it through a multi-zone air drying oven having three heating zones spaced apart axially along the length of the carrier, with each drying zone having a progressively higher temperature. The enamel-coated polyester sheet was passed through the heating zones of a line speed of about 30 meters per minute; each heating zone was about 12 meters long. Temperatures of the three heating zones were: zone 1:125° C., Zone 2:165° C., Zone 3: 200° C. By passing the enamel coated polyester sheet through the three heating zones, substantially all solvent gases from the low surface energy rough enamel coat were removed and the coating was cured to produce a dry solvent resistant coat of uniform thickness about 10 microns thick. The surface energy of the coating was 40 dynes/cm and the surface energy of the polyester was 45 dynes/cm.

A clear gloss acrylic coating composition was prepared as follows:

| Ingredients | Parts by Weight | Parts Solvent | Parts Active Retarder Solvent |
| --- | --- | --- | --- |
| Aromatic controlled Mineral Spirits | 6.94 | 6.94 | — |
| Diethylene glycol monobutyl ether | 5.00 | 5.00 | 5.00 |
| Diethyl phthalate | 2.37 | 2.37 | 2.37 |
| Acrylic Dispersion Resin (40% solids of an acrylic polymer described in Example 1 of U.S. Pat. No. 3,660,537 Tg = 90° C.) | 74.05 | 44.43 | 15.55 |
| Coconut oil alkyd (85% solids coconut oil/ethylene glycol/ phthalic anhydride) | 3.33 | .51 | — |
| Butyl benzyl phthalate Polyester plasticizer (85% solids phthalic anhydride/ethylene glycol/benzoic acid) | 3.37 | — | — |
| UV absorber ("Tinuvin" 900, 2-hydroxy-3, 5-di[1,1-dimethyl-(benzyl)phenyl]-2H-benzo-triazole | .75 | — | — |
| Hindered amine light stabilizer ["Tinuvin" 292, bis(1,2,2,6,6-pentamethyl-4-piperidinyl) sebacate] | .75 | — | — |
| Silicone solution | .20 | .15 | — |
| | 100.17 | 59.91 | 22.92 |

The clear acrylic coating was applied to the polyester sheet opposite the side coated with the low surface energy rough enamel by reversing the previously prepared roll and roll coating was applied using the same procedure as for the enamel coating, except that the line speed was 7.5 meters/min. and the temperatures of the zones were: Zone 1: 38° C., Zone 2: 93° C., Zone 3: 150° C.; to obtain a film thickness of 35 microns. The clear acrylic coating was formulated with 38.55% active retarder solvent and the resulting coating after drying when measured after 90 minutes bake at 105° C. and was shown to have a weight solids of 91.5% and correspondingly 8.5% by weight solvent. The Tg of the cured acrylic coating is 69° C.

A color coating was formulated as follows:

| Ingredient | Parts | Parts Solvent | Parts Active Retarder Solvent |
| --- | --- | --- | --- |
| Acrylic dispersion resin (described above) | 62.2 | 37.57 | 13.15 |
| Polyester plasticizer (described above) | 2.54 | .51 | — |
| Coconut oil alkyd | 2.54 | .52 | — |

-continued

| Ingredient | Parts | Parts Solvent | Parts Active Retarder Solvent |
| --- | --- | --- | --- |
| (described above) | | | |
| Butyl benzyl phthalate | 1.14 | — | — |
| UV absorber (described above) | 0.32 | — | — |
| Hindered amine light stabilizer (described above) | 0.32 | — | — |
| Silicone solution | 0.03 | — | — |
| Black Pigment dispersion | 30.49 | 18.29 | 5.49 |
| Total | 100.00 | 56.88 | 18.64 |

The black dispersion comprised carbon black pigment in a vehicle of acrylic dispersion resin and butyl benzyl phthalate.

The color coating was coated onto the dried clear coat of the polyester film as described above and then passed through the three-stage oven described above to dry the color coat. The resulting color coat was about 30 microns in thickness. The acrylic color coat was formulated with 32.8% and the resulting color coat/clear coat film was shown to have a weight solids of 90.7% and 9.3% by weight solvent.

A CPO (chlorinated polyolefin) size coating composition for use with a TPO backing sheet was formulated as follows:

| Ingredients | Parts |
| --- | --- |
| Xylene | 24.60 |
| Chlorinated polyolefin (CPO) solution (Eastman's CP-343-1 25% solids in xylene of chlorinated polypropylene/maleic acid polymer, Acid No. about 15, chlorine content about 18-23%) | 25.00 |
| Toluene | 42.50 |
| N-methyl pyrrolidone | 1.00 |
| Acrylic Dispersion Resin (60% solids of an acrylic vinyl oxazoline ester polymer described in Example 1 of Miller U.S. Pat. No. 3,844,993) | 6.90 |
| Total | 100.00 |

The binder of the size coating composition contained about 60% CPO (chlorinated polyolefin) and 40% acrylic resin by weight. The size coat composition was coated onto the dried color coat to a dry film thickness of about 2.5 microns using the reverse roll coater. The three temperature zones were maintained at the same temperature as used for the clear and color coats but a carrier speed 30 meters per minute was used. The resulting clear coat/color coat/size film was shown to have a solids weight percent of 92.9.

The resulting paint coated polyester film was then passed to a laminating operation illustrated in FIG. 3, where the paint coat of the polyester film was laminated to a 500 micron thick TPO (thermoplastic polyolefin) backing sheet of RPI E-1000, thermoplastic olefinic elastomer to form a face sheet. RPI E-1000 has a flexural modulus of approximately 690 MPa and a melt flow rate of approximately 0.8 g/10 minutes. In the laminating operation, the backing and the paint coated polyester film carrier were run at a lineal speed of 5 meters per minute, and the laminating drum was operated at a temperature of 177° C. The CPO size coat was heat activated and the paint coat was attached to the face of the TPO backing sheet during the laminating operation, in which the hot steel drum applied a force of about 54 kg/lineal cm to form the face sheet.

The resulting face sheet was then stripped from the polyester film and thermoformed into a complex three-dimension shape to form the plastic quarter panel molding (illustrated in FIG. 4). In the thermoforming process, the face sheet was first heated to a temperature of about 121° C. to soften the face sheet. The heated face sheet then was placed over a pressure assist vacuum former buck and a vacuum was drawn against the buck on the TPO side of the face sheet and 2.1 kg/cm$^2$ gauge of air pressure applied on the clear coat side of the laminate to form the heated face sheet into the three dimensional shape of the quarter panel.

The resulting thermoformed laminate was then trimmed to fit in the mold cavity of a plastic injection molding machine (see FIG. 4). A quarter panel was then formed. An elastomeric thermoplastic alloy molding resin RTA-3263 from Republic Plastics Company, having a flexural modulus of about 1725 MPa was used for forming the base of the quarter panel. The resin was injected into the mold behind the thermoformed laminate fusing the resin to the TPO base of the laminate to form the quarter panel about 2.5–3.75 mm thick. The mold was operated at the normal melt temperature for the resin. A quarter panel was formed that is in an integral plastic composite part with a defect-free paint coat on the exterior surface of the panel.

The quarter panel was tested and the tests demonstrated the usefulness of the paint coat on the exterior automotive finish. The test results indicated that desirable appearance properties, including gloss, were produced. Specular reflectance measured 85° at 20°. and DOI (Distinctness of Image) measured 85. Color uniformity was good. The test results also demonstrated a desirable combination of durability properties. The test panel passed tests for gasoline resistance, acid resistance, chip resistance (gravelometer reading of 9) and passed QUV and 96 hour humidity exposure tests.

Example 2

A quarter panel was formed as in Example 1, except the CPO size was omitted and the black color coat/clear coat finish was laminated directly to Borg Warner Cycolac ® L 20 mil ABS sheet. The black color coat/clear coat ABS laminate was then thermoformed as in Example 1 except the sheet was heated to around 140° C. before forming.

The resulting thermoformed laminate was then trimmed to fit in the mold cavity of a plastic injection molding machine. A quarter panel was then formed by injecting Borg Warner Cycolac ® L ABS resin behind the thermoform.

The quarter panel was tested and the tests demonstrated the usefulness of the paint coat as an exterior automotive finish.

Attempts were made to make a face sheet as in Example 1, except the low surface energy enamel was not applied to the backside of the polyester sheet. All attempts were unsuccessful because the clear coat adhered to the backside of the polyester sheet. This prevented further processing because the roll could not be unwound.

Example 3

A quarter panel was formed as in Example 2, except the following white color coat and clear coat acrylic coatings were substituted for the black color coat/clear coat acrylic dispersion coating of Example 2. The clear coat was prepared as follows:

| Ingredients | Parts | Parts Solvent | Parts Active Retarder Solvent |
|---|---|---|---|
| Xylene | 68.55 | 68.55 | — |
| Polymethyl methacrylate (40% solids) | 24.8 | 14.88 | — |
| Methyl methacrylate/ Butyl acrylate copolymer solution (85/15–40% solids) | 26.2 | 15.70 | — |
| Methyl methacrylate/ Diethyl amino ethyl methacrylate copolymer solution (99/1–40% solids) | 5.0 | 3.00 | — |
| Coconut oil alkyd (85% solids coconut oil/ethylene glycol/ phthalic anhydride) | 9.4 | 1.41 | — |
| Butyl benzyl phthalate | 5.0 | — | — |
| Cellulose acetate butyrate solution (Kodak CAB-381-2-25% solids) | 16 | 12.0 | — |
| Cellulose acetate butyrate solution (Kodak CAB-381-2-15% solids) | 13.33 | 11.33 | — |
| Diethylphthalate | 31.72 | 31.72 | 31.72 |

The clear coating which contained 25% by volume high boiling active solvents on total organic solvent was applied to the polyester film as in Example 1 to form a dry film having a thickness of about 45 microns. The clear coat was at 88.5% solids after processing.

A color coating was formulated as follows:

| Ingredients | Parts | Parts Solvent | Parts Active Solvent |
|---|---|---|---|
| Xylene | 65.77 | 65.77 | — |
| Coconut oil alkyd (85% solids coconut oil/ethylene glycol/ phthalic anhydride) | 6.96 | 1.04 | — |
| White dispersion | 27.37 | | |
| Butyl benzyl phthalate | 2.67 | — | — |
| Polymethylmethacrylate solution (40% solids) | 15.82 | 6.33 | — |
| Methyl methacrylate/ Diethyl amino ethyl methacrylate copolymer solution (99/1–40% solids) | 1.67 | 1.0 | — |
| Methyl methacrylate/ Butyl acrylate copolymer solution (85/15–40% solids) | 19.41 | 11.65 | — |
| Polybutylacrylate solution (50% solids) | .18 | .09 | — |
| Cellulose acetate butyrate solution CAB-381-2 (Kodak Co.) | 10.24 | 7.68 | — |
| Cellulose acetate butyrate solution (15% solids) | 9.88 | 8.40 | — |
| Diethylphthalate | 40.00 | 40.00 | 40.00 |

The white pigment dispersion comprised titanium dioxide pigment in a vehicle of methyl methacrylate/-diethyl aminoethyl methacrylate copolymer (99/1).

The white coating which contained 25% by volume high boiling active solvents or total organic solvent was applied to the polyester film as in Example 2 to form a dry film having a thickness of about 50 microns. The color coat/clear coat was at 90% solids after processing and contained 10% solvent.

The white color coat/clear coat on treated polyester film was processed as in Example 2 and a quarter panel was formed that is an integral plastic composite part with a defect-free paint coat on the exterior surface of the panel.

The quarter panel was tested as in Example 2. The test results showed that the finish of the panel had desirable appearance properties, including excellent gloss. Specular reflectance was 85° at 20° and DOI was 85. Color uniformity was good. The test results also demonstrated a desirable combination of durability properties for the panel finish. The test panel passed gasoline resistance, acid resistance, abrasion resistance, impact resistance and QUV and 96 hour humidity exposure tests.

EXAMPLE 4

A series of white color coat/clear coat finishes were made based on Du Pont "Elvacite" 2010 polymethyl methacrylate bead polymer.

The clear coats were prepared from the following formulations:

| Ingredient | Clear A | Clear B | Clear C |
|---|---|---|---|
| Polymethyl methacrylate (Elvacite 2010) | 20 | 15 | 15 |
| Butyl benzyl phthalate | — | 5 | 5 |
| Methyl ethyl ketone | 60 | 60 | 60 |
| Toluene | 20 | 20 | — |
| Mixed methyl esters of succinic, glutonic and adipic acids | — | — | 20 |

The ingredients were mixed at high speed at a temperature of about 55° C. The clear coat was then drawn down on a polyester sheet to a dry film thickness of 35 microns and baked 4 minutes at 150° C. The weight solids of clears A, B, and C were 98, 98.5 and 89% respectively. Clear coats A and B were extremely brittle since these coats only contain 2% and 1.5% solvent. Clear coat C was flexible and contained 11% solvent.

Corresponding white color coats were prepared as follows:

| Ingredient | Color A | Color B | Color C |
|---|---|---|---|
| White dispersion (200 P/B TiO$_2$, 60% solids) | 100 | 100 | 100 |
| Polymethyl methacrylate ("Elvacite" 2010) | 80 | 55 | 55 |
| Butyl benzyl phthalate | — | 25 | 25 |
| Methylethylketone | 300 | 300 | 300 |
| Toluene | 220 | 220 | — |
| Mixed methyl esters of succinic, glutonic and adipic acids | — | — | 220 |

The ingredients were mixed at high speed at a temperature of about 55° C. The white color coats were drawn down over the corresponding clear coats to a dry film thickness of 50 microns and baked 4 minutes at 150° C. The weight solids of the resultant color coat/-clear coats were 97.5, 97 and 91% respectively.

White color coat/clear coat composition A was very brittle and probably could not be made on production equipment. However this sample was carefully laminated and thermoformed. It cracked during lamination and thermoforming.

White color coat/clear coat composition B was less brittle and probably could be made and laminated in production. This sample was carefully laminated and thermoformed. Cracking occurred during thermoforming.

White color coat/clear coat composition C was laminated and thermoformed without difficulty.

I claim

1. A process for forming a composite useful as an exterior vehicle body part comprising the following steps:
   a. applying a clear layer of an acrylic thermoplastic polymer coating composition to a flexible polymeric carrier sheet having a smooth glossy surface wherein the acrylic polymer has a glass transition temperature of about 75°–105° C. and comprises polymethyl methacrylate, copolymers of methyl methacrylate or graft copolymers of methyl methacrylate or mixtures thereof in an organic solvent having at least 15% by volume of solvent having a boiling point of about 150°–300° C.;
   b. partially drying said clear layer leaving about 5–15% by weight, based on the weight of the clear layer, of solvent in the layer;
   c. applying a pigmented layer of an acrylic thermoplastic polymer coating composition onto the clear layer, wherein the polymer has a glass transition temperature of about 75°–105° C. and comprises polymethyl methacrylate, copolymers of methyl methacrylate or graft copolymers of methyl methacrylate or mixtures thereof and pigment in an organic solvent having at least 15% by volume of solvent having a boiling point of about 150°–300° C.;
   d. partially drying said pigmented layer leaving about 5–15% by weight, based on the weight of the pigmented layer, of solvent in the layer;
   e. laminating with heat and pressure the flexible polymeric carrier sheet with the clear layer and pigmented layer to a flexible thermoformable polymeric material with the pigmented layer being adhered to the thermoformable polymeric material to form a laminate; wherein on removal of the carrier sheet, the exterior surface of the clear layer substantially retains the glossy surface transferred to it from the polymeric carrier sheet;
   f. removing the polymeric carrier sheet from the laminate;
   g. thermoforming the laminate and the clear layer and pigmented layer thereon to form a three dimensionally shaped preformed laminate; and
   h. adhering the flexible polymeric material of the thermoformed laminate to a rigid synthetic resinous substrate to form a composite useful as an exterior vehicle body part.

2. The process of claim 1 in which the laminating in step e. is at a temperature of about 150° C.–250° C. and at a pressure of about 10–75 kg/linear cm.

3. The process of claim 2 in which the flexible polymeric carrier sheet is a thin polyester film.

4. The process of claim 3 in which the polyester film is coated on the side not in contact with the clear layer with a very thin layer of a low surface energy polymeric coating that has a surface energy of less than 42 dynes/cm and at least 4 dynes/cm less than the polyester film.

5. The process of claim 4 in which the low surface energy coating has a surface energy of about 30–42 dynes/cm and layer is about 5–25 microns thick.

6. The process of claim 5 in which the low surface energy coating comprises alkyd resin or an acrylic modified alkyd resin, vinyl chloride/vinyl acetate/vinyl alcohol polymer and a fully alkylated melamine resin crosslinking agent and the composition is modified with polyethylene wax or polymethylsiloxane resin and contains aluminum silicate pigment.

7. The process of claim 1 wherein the clear layer and the pigmented layer form the exterior surface of the composite and have a gloss of at least 80 measured at 20° and a distinctness of image of at least 80.

8. The process of claim 1 in which the acrylic thermoplastic polymer coating composition of the clear layer comprises about 70–90% by weight of acrylic polymer and about 10–30% by weight of components selected from the group consisting of plasticizers, ultraviolet light screeners, ultraviolet light stabilizers, microgel, flow control agent and mixtures of any or all of the above.

9. The process of claim 8 in which the acrylic polymer in the clear layer and the pigmented layer has a weight average molecular weight of about 50,000–500,000.

10. The process of claim 9 in which the acrylic polymer of the coating composition comprises a blend of polymethyl methacrylate and a copolymer of methyl methacrylate and an alkylacrylate or an alkyl methacrylate other than methyl methacrylate.

11. The process of claim 9 in which the acrylic polymer of the coating composition comprises polymethyl methacrylate and a graft copolymer having a backbone of polymerized monomers of ester of acrylic acid or methacrylic acid and allyl methacrylate or allyl acrylate grafting sites having grafted thereto polymeric segments of alkyl acrylate or alkyl methacrylate units.

12. The process of claim 8 in which the acrylic thermoplastic polymer coating composition of the pigmented layer comprises about 70–90% by weight of acrylic polymer and about 10–30% by weight of components selected from the group consisting of plasticizers, ultraviolet light screeners, ultraviolet light stabilizers, microgel, flow control agent and mixtures of any or all of the above and contains pigment in a pigment to binder ratio of about 1/100–100/100 wherein the binder comprises the film forming constituents of the coating composition.

13. The process of claim 12 in which the acrylic polymer of the coating composition comprises a blend of polymethyl methacrylate and a copolymer of methyl methacrylate and an alkylacrylate or an alkyl methacrylate other than methyl methacrylate.

14. The process of claim 12 in which the acrylic polymer of the coating composition comprises polymethyl methacrylate and a graft copolymer having a backbone of polymerized monomers of ester of acrylic acid or methacrylic acid and allyl methacrylate or allyl acrylate grafting sites having grafted thereto polymeric segments of alkyl acrylate or alkyl methacrylate units.

15. The process of claim 1 in which at least one thin size layer is applied to the pigmented layer after step d. and is dried; wherein the size layer is selected from the group consisting of polyalkyl acrylates, polyalkyl methacrylates, vinylchloride polymers, polyurethanes, polyimides, chlorinated polyolefins and any mixtures thereof.

16. The process of claim 15 in which the size layer is a chlorinated polyolefin comprising a thermoplastic chlorinated polyolefin.

17. The process of claim 16 in which the chlorinated polyolefin comprises a chlorinated polyolefin containing up to 50% by weight chlorine.

18. The process of claim 15 in which the chlorinated polyolefin consists essentially of propylene/maleic acid copolymer containing about 15-50% by weight chlorine.

19. The process of claim 15 in which the size layer is about 1-25 microns thick and consists essentially of a chlorinated polypropylene and maleic anhydride polymer containing about 18-35% by weight chlorine.

20. The process of claim 15 in which the size layer comprises a mixture containing at least 30% by weight of chlorinated polyolefin containing up to 70% by weight of a thermoplastic polymer selected from the group consisting of ethylene vinyl acetate polymer, alkyd resin, and acrylic polymers.

21. The process of claim 7 in which the flexible thermoformable polymeric material comprises a polymer having a flexural modulus of about 175-2100 MPa and is selected from the group consisting of thermoplastic polyolefin, acrylonitrile-butadiene-styrene terpolymer, polystyrene and styrene-acrylonitrile copolymer and copolymers thereof.

22. The process of claim 7 in which the flexible thermoformable polymeric material comprises a polyolefin of polypropylene or polyethylene having a melt flow of about 0.5-2.0 g/10 min.

23. The process of claim 22 in which the flexible layer of thermoformable polyolefin comprises an extruded sheet of a compounded mixture of polypropylene, a synthetic elastomeric resin, pigments and additives.

24. The process of claim 21 in which the flexible thermoformable polymer material comprises a sheet of a acrylonitrile-butadiene-styrene terpolymer.

25. The process of claim 7 in which the rigid synthetic resinous substrate comprises a thermoformable polymeric material having a flexural modulus of about 175-2100 MPa and has a melt flow rate of about 0.5-8.0 g/10 min. and the thermoformable polymeric material is selected from the group consisting of thermoplastic polyolefin, acrylonitrile-butadine-styrene terpolymer, polystyrene and styrene-acrylonitrile copolymer and copolymers thereof.

26. The process of claim 25 in which the thermoformable polymeric material of the rigid synthetic resinous substrate is injection molded in contact with the laminate to form the composite.

27. The process of claim 25 in which the thermoformable polymeric material is a thermoplastic of polyethylene or polypropylene.

28. The process of claim 25 in which the thermoformable polymeric material is a thermoplastic polyolefin that has a flexural modulus of about 175-2100 MPa and the polyolefin has a melt flow rate of about 4.0-8.0 g/10 min.

29. The process of claim 25 in which the thermoformable polymeric material consists of acrylonitrile-butadiene-styrene terpolymer.

30. A process for forming a laminate useful for forming composite materials used as an exterior vehicle body part comprising the following steps:
   a. applying a clear layer of an acrylic thermoplastic polymer coating composition to a flexible polymeric carrier sheet having a smooth glossy surface wherein the acrylic polymer has a glass transition temperature of about 75°-105° C. and comprises polymethyl methacrylate, copolymers of methyl methacrylate or graft copolymers of methyl methacrylate or mixtures thereof in an organic solvent having at least 15% by volume of solvent having a boiling point of about 150°-300° C.;
   b. partially drying said clear layer leaving about 5-15% by weight, based on the weight of the clear layer, of solvent in the layer;
   c. applying a pigmented layer onto the clear layer of an acrylic thermoplastic polymer coating composition wherein the polymer has a glass transition temperature of about 75°-105° C. comprising polymethyl methacrylate, copolymers of methyl methacrylate or graft copolymers of methyl methacrylate or mixtures thereof and pigment in an organic solvent having at least 15% by volume of solvent having a boiling point of about 150°-300° C.;
   d. partially drying said pigmented layer leaving about 5-15% by weight, based on the weight of the pigmented layer, of solvent in the layer;
   e. laminating with heat and pressure the flexible polymeric carrier sheet with the clear layer and pigmented layer to a flexible thermoformable polymeric material with the pigmented layer being adhered to the thermoformable polymeric material to form a laminate; wherein on removal of the carrier sheet, the exterior surface of the clear layer substantially retains the glossy surface transferred to it from the polymeric carrier sheet;

* * * * *